May 23, 1950 J. J. McCANN Re. 23,232

STRAND SPINNING AND TWISTING MECHANISM

Original Filed June 26, 1941 3 Sheets-Sheet 1

INVENTOR.
JOHN J. McCANN,
BY Kenway & Witter
ATTORNEY.

May 23, 1950 J. J. McCANN Re. 23,232

STRAND SPINNING AND TWISTING MECHANISM

Original Filed June 26, 1941 3 Sheets-Sheet 2

INVENTOR.
JOHN J. McCANN,
BY Kenway & Witter
ATTORNEY.

STRAND SPINNING AND TWISTING MECHANISM
Original Filed June 26, 1941 3 Sheets-Sheet 3
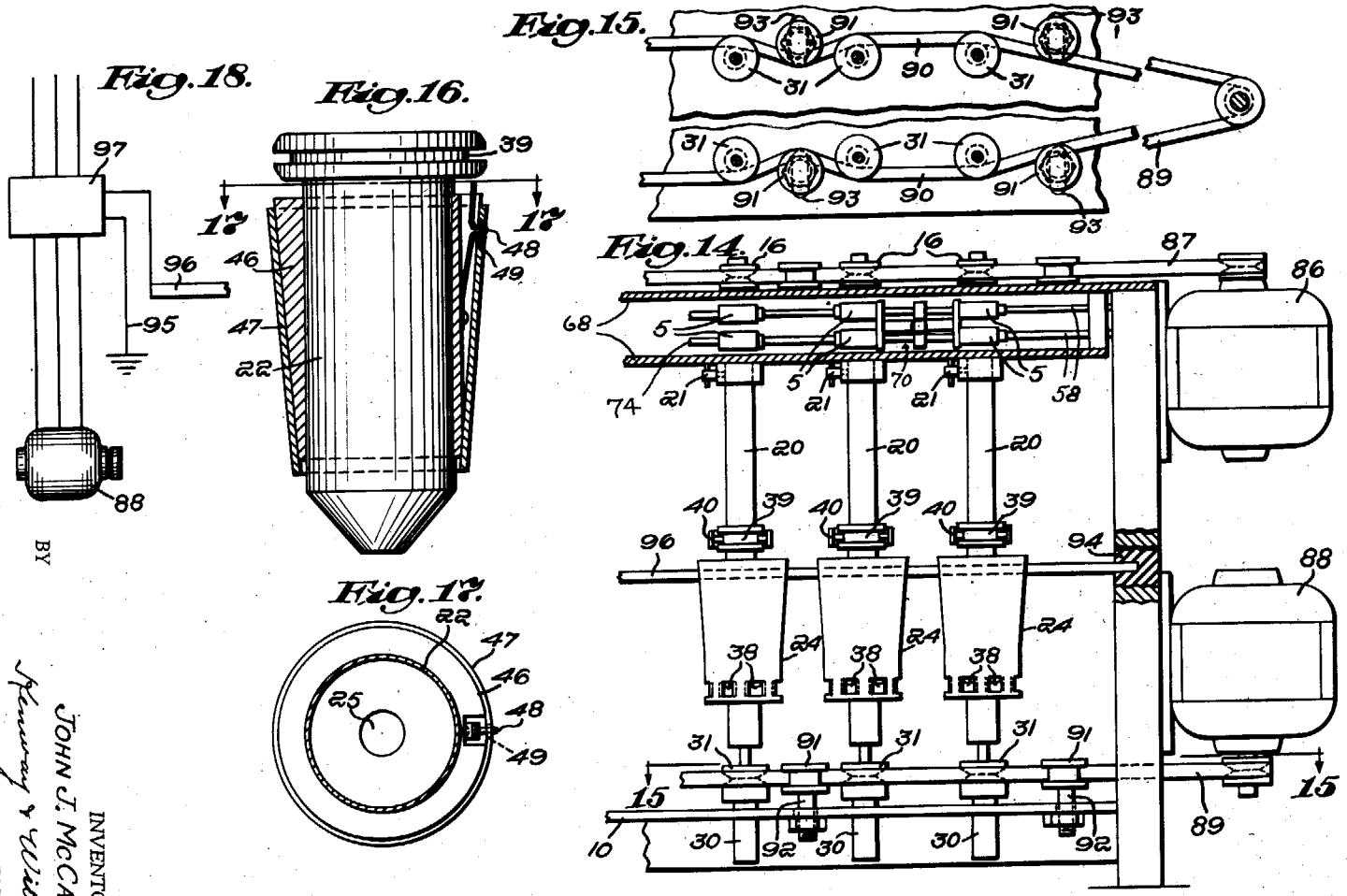
INVENTOR.
JOHN J. McCANN,
BY Kenway & Witter
ATTORNEY.

Reissued May 23, 1950

Re. 23,232

UNITED STATES PATENT OFFICE 23,232

STRAND SPINNING AND TWISTING MECHANISM

John J. McCann, Lowell, Mass.

Original No. 2,321,404, dated June 8, 1943, Serial No. 399,836, June 26, 1941. Application for reissue January 31, 1950, Serial No. 141,568

21 Claims. (Cl. 57—51)

Figures 1, 2, 3, 4:
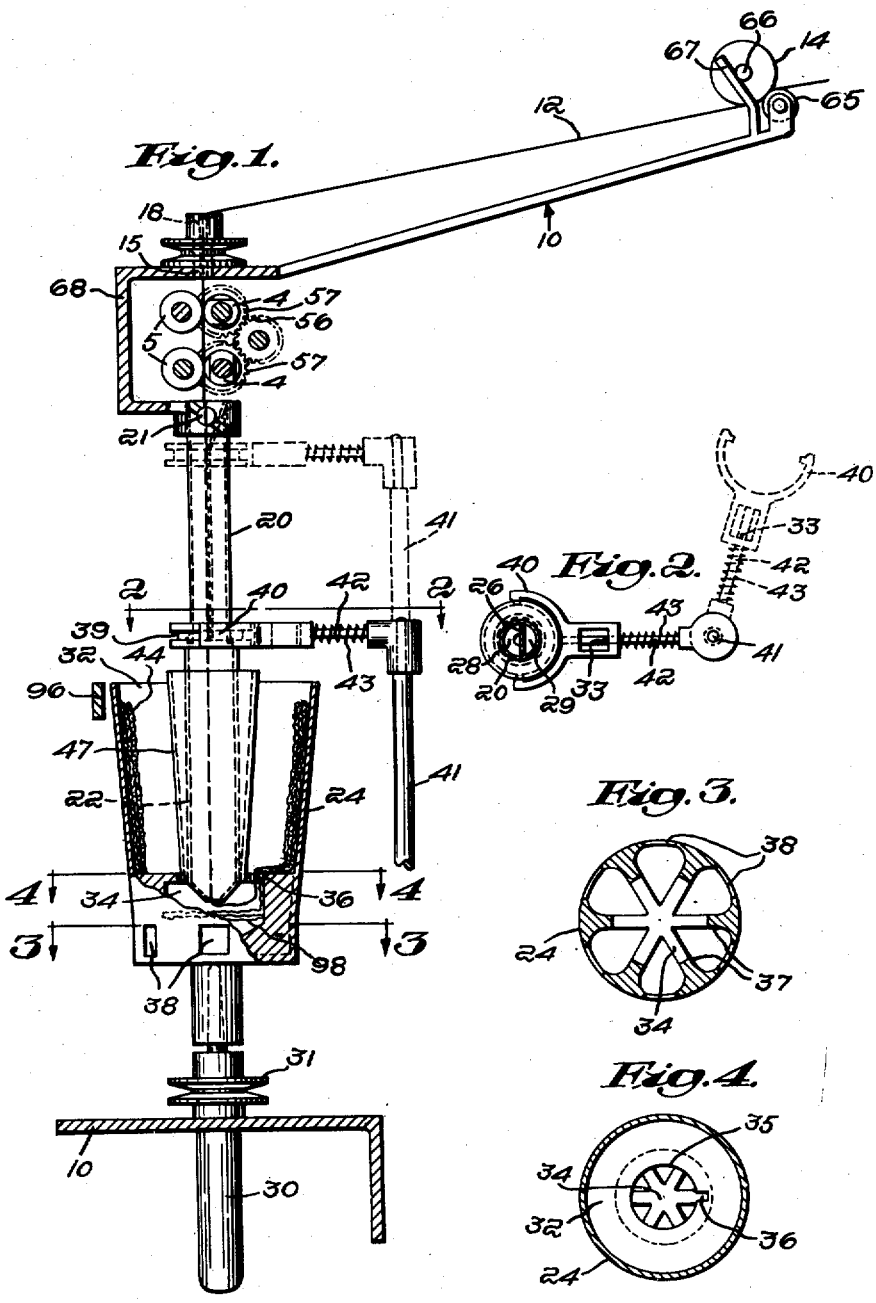

Matter enclosed in heavy brackets [ ] appears in the original patent but forms no part of this reissue specification; matter printed in italics indicates the additions made by reissue

This application is a continuation in part of my copending application Ser. No. 287,993, filed August 2, 1939, now Patent No. 2,291,819, dated August 4, 1942, and the invention relates to novel mechanism for spinning or twisting a continuous strand of fibrous material into twisted yarn of superior quality and for conducting and winding the finished strand to and into suitable compact units. The invention also concerns a superior system of drafting and twisting and in cooperation therewith novel pot spinning and yarn guiding mechanism, all for the purpose of producing a superior product and increased production more efficiently and economically than has been heretofore possible.

Continuous woolen yarn drafting is commonly practiced by placing a false and strengthening twist in the strand while drafting or stretching it, whereby to render the same more uniform, all of which false twist comes out of the strand before it is given the final twist and wound, as described in Patent No. 806,086. My invention contemplates the production of a superior yarn by so rotating or turning the strand on its axis as to effect a strengthening-sealing twist therein to seal the thin portions against further elongation in the drawfield, and thereafter twisting the strand while so supporting it that such twist follows along the strand to the said rotating or turning position in the drawfield where it unites with or blends into the strengthening-sealing twist effected by the said turning action. The production of a yarn resulting from these cooperating functions comprises one object of the invention.

The apparatus includes two or more relatively spaced drawing units for alternately or successively gripping and releasing the yarn as it passes from the twisting tube to the twisting and winding mechanism. These units permit the yarn twist to pass therethrough from the winding mechanism upwardly to the sealing twist and permit the yarn with its resultant twist to pass downwardly therethrough to the twisting and winding mechanism where it is wound into suitable units, the sealing twist thereby not only being retained in the final product but being furthermore augmented by the cooperating twisting action of the twisting and winding mechanism. The twisting tube illustrated is provided with strand teetering shoulders and it can be readily removed for certain twisting operations wherein it is not required, and cooperating with the tube is a strand guide for receiving and conducting the yarn as it passes from the drawing units.

The invention also incorporates a novel multichamber spinning pot for twisting and receiving the yarn and winding it into a cheese, and cooperating with the pot is a tube mounted to reciprocate on the strand guide and conduct the yarn into the pot, the tube being adapted to carry a cone thereon within the pot for receiving the yarn cheese in collapsed form thereonto when the pot is stopped and at which time the cone and cheese can be removed from the pot and tube as a unit. The strand guide is also constructed to provide easy passage of the yarn and yet prevent objectionable ballooning thereof, thereby permitting greater speeds and producing a superior product impossible in spinning mechanism heretofore known.

Another important feature of the invention relates to novel mechanism for automatically threading and re-threading the yarn into the spinning pot by means of a current of air directed through the strand guiding channel and so confined as to draw the strand into and through the channel when its leading end is introduced thereinto. The yarn passes through the channel and into the spinning pot and, in the preferred form of the invention, the current of air is induced by a fan attached to the spinning pot.

Other novel features of the invention relate to an improved drafting front roll unit quickly releasable to yarn threading position, improved mechanism for releasing the traversing yarn-guiding tube from its movement relative to the spinning pot, and safety mechanism for stopping the machine should a spinning pot get out of balance.

These and other features and advantages of my invention will be more readily understood and appreciated from the following description of preferred embodiments thereof selected for purposes of illustration and shown in the accompanying drawings in which—

Figure 5:
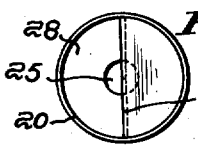
Figure 6:
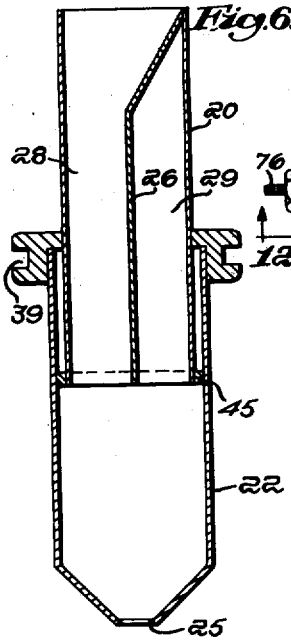
Figure 7:
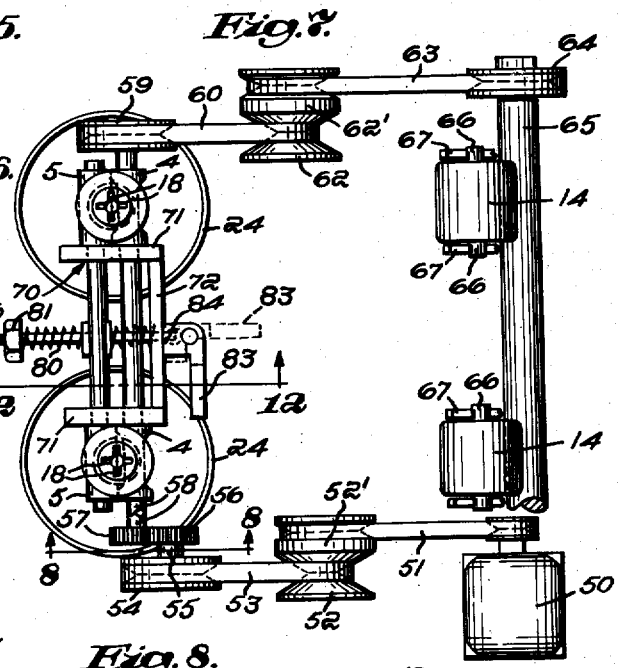
Figure 8:
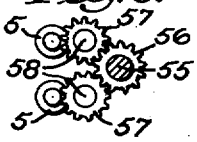
Figure 9:
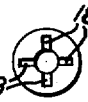
Figure 10:
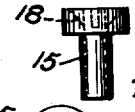
Figure 11:
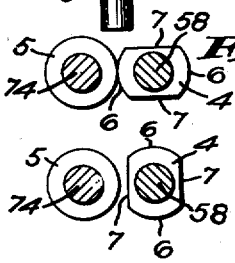
Figure 12:
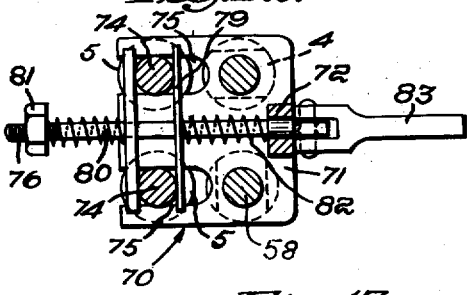
Figure 13:
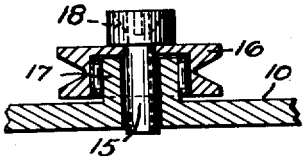

Fig. 1 is a fragmentary side elevation, partially in section, of one unit of an apparatus embodying my invention, Fig. 2 is a fragmentary plan view taken on line 2—2 of Fig. 1, Figs. 3 and 4 are sectional views taken on lines 3—3 and 4—4 of Fig. 1, Fig. 5 is a top end view of the strand guide, Fig. 6 is a longitudinal sectional view therethrough and through the cone supporting tube thereon, Fig. 7 is a fragmentary plan view of the machine, Fig. 8 is a fragmentary view taken on line 8—8 of Fig. 7, Fig. 9 is a top end view of the twisting tube, Fig. 10 is a side elevation thereof, Fig. 11 is a cross-sectional view through the strand drawing rolls, Fig. 12 is a view through the drawing roll unit taken on line 12—12 of Fig. 7, but showing the rolls in open position, Fig. 13 is a sectional view through the twisting tube supporting whirl, Fig. 14 is a fragmentary front elevation of the machine, Fig. 15 is a fragmentary plan view of the V-belt drive for the spinning pots, taken on line 15—15 of Fig. 14, Fig. 16 is a side elevation of the cone carrying tube and illustrating in longitudinal section a cheese-receiving cone thereon, Fig. 17 is a cross-sectional view taken on line 17—17 of Fig. 16, Fig. 18 is a wiring diagram of the spinning pot safety control.

The machine illustrated comprises a frame 10 carrying a plurality of strand spinning and twisting units of which one unit is illustrated in Fig. 1. Each strand 12 to be spun into yarn passes from the delivery rolls 14 into a drawfield and to and through a twister tube 15 loosely resting by gravity within a whirl 16 rotatably supported by roller bearings on a stud 17. Beneath and in alignment with the tube are two relatively spaced drawing units each comprising a roll 5 with a continuous circular periphery and a cooperating roll 4 having two cooperating peripheral portions 6 and two slabbed off portions 7. The strand 12 passes from the delivery rolls into the tube 15 in position to be engaged and teetered by shoulders formed by slotting the top end of the tube at 18, these shoulders causing a rapid vibrating or trembling action on the strand and aiding the drafting thereof. This action by the shoulders is commonly called "teetering." After passing from the tube, the rotation of which places strengthening-sealing twist therein, the strand is gripped continuously by the drawing units, each unit being adapted to grip the strand while the other unit is released therefrom. While I have herein illustrated two drawing units 4—5 operating alternately to grip and release the yarn strand, it will be apparent that more than two such units can be employed. The rolls 4 are driven synchronously by gearing illustrated in Fig. 8 and hereinafter described and the units are so constructed that the strand is never fully released but is gripped by one unit at all times.

Carried on the frame beneath the units 4—5 is a tubular guide 20 releasably supported at its top end in the frame by a clamping screw 21. A tube 22 mounted to reciprocate on and over the bottom end portion of the guide extends into a spinning pot 24 and is provided with a restricted exit 25 through its bottom end. The rotation of the pot spins or twists the yarn strand as will be understood. A partition 26 extends longitudinally through the guide 20 and divides it into two channels. One channel 28 is open throughout the length of the tube for receiving and conducting the strand therethrough with a minimum of ballooning as the yarn passes through the tube. The partition has a relatively long body portion having a thread guiding face located substantially at the center of the tubular guide (Fig. 6) and a portion at the top end thereof slanting laterally away from said center and providing a relatively angular surface leading to and cooperating with the first-named surface to guide the strand into and through the tube. Since the spinning yarn cannot pass beyond the partition toward the other channel, the ballooning tendency in that direction will be definitely eliminated and, since ballooning is restricted, the strand will remain substantially at the center of the spinning axis where there is a minimum of centrifugal action. Thus ballooning of the yarn within the tube is substantially eliminated while leaving the channel 28 fully open to the passage of the yarn and a conducting air current hereinafter described, the restricted exit 25 also cooperating to restrict ballooning of the yarn. The other channel 29 is closed at its top end by the top end of the partition (Figs. 5 and 6) and may be used to conduct steam downwardly into the spinning pot 24 to condition the yarn therein as disclosed in my said copending application.

It may be explained that ballooning or whirling of the strand about a center causes tension on the strand due to air resistance and frictional resistance if the strand comes in contact with a wall or other surface that is not at or near its spinning axis. This resistance is very objectionable and particularly since in spinning, (1) it causes the outer layers of fibre to be wrapped spirally about the strand whereby producing an inferior yarn, and thus prevents the strand from being twisted around its own axis in a manner to produce a round, uniform and high-grade yarn, and (2) since the air resistance increases approximately in proportion to the square of the strand velocity, the ballooning tension set up by the resistance limits the speed of twisting and results in breakage of fibre and of the strand itself. Confining of the strand to the central twisting axis of the yarn permits uniform twisting of the fibers about the yarn with a minimum of the objectionable results produced by ballooning when the yarn is twisted without being thus confined.

The spinning pot 24 is supported for rotation in the frame preferably on a self-balancing spindle 30 provided with a V-belt whirl 31. The pot has an open top chamber 32 and a smaller bottom chamber 34 with a centrally disposed opening 35 therebetween, a notched opening 36 extending laterally outward of the opening 35 for a purpose hereinafter described. The bottom portion of the pot beneath the chamber 34 is cored out to provide a plurality of fan blades 37 and openings 38 between the blades, the construction being such as to draw air downwardly through the pot when the pot is rotated in either direction. When the tube 22 is dropped into the opening 35, as illustrated in Fig. 1, air is drawn downwardly through the yarn channel in the tube 22 and guide 20. The chamber 34 is substantially smaller in diameter than the chamber 32 and therefore generates a much smaller centrifugal force on the starting or leading ends of the strands which may not have the twist and therefore the strength necessary to twist and wind this leading end at high speed within the large chamber 32.

The tube 22 carries a grooved collar 39 on its top end adapted to be engaged by the yoke 40 of a traversing mechanism. This mechanism includes a vertical rod 41 supporting a horizontal rod 42 on which the yoke is swiveled, a spring 43 on the rod 42 normally forcing the yoke against a stop pin 33 and into engagement with the collar. The yoke is universally mounted for free rotation about the horizontal axis 42 and about the vertical axis 41 whereby to eliminate any binding action relative to the tube and permit free rotation of the tube. Movement of the yoke about the vertical rod 41 also permits swinging of the yoke to a rearward position when doffing the filled cone 47. Mechanism (not illustrated) is provided for reciprocating the rod 41 vertically whereby to conduct the exit end 25 of the tube through the pot and form the yarn cheese 44 by centrifugal action during the spinning operation. The tube slides telescopically over a collar 45 on the bottom end of the guide and when the yoke is forced rearwardly against the spring 43 and thus released from the collar 39 the tube drops to the position permitted by the collar 35 in which the bottom end of the tube projects into the chamber 34. The tube 22 has frictionally mounted thereon a conical element 46 adapted to receive and support a paper cheese-receiving cone 47, a detent 48 being provided on the element for engaging a hole 49 in the cone to hold the cone positioned on the element.

The rolls 4 of the drawing units and the delivery rolls 14 are driven by a motor 50 having a V-belt connection 51 to a variable speed sheave 52 connected by a V-belt 53 to a sheave 54 on a shaft 55. A gear 56 on this shaft is in mesh with two pinions 57 on shafts 58 extending the length of the machine and carrying the rolls 4. A sheave 59 on the other end of one of the shafts 58 is connected by a V-belt 60 to one side of a variable speed sheave 62. A V-belt 63 connects the other side of sheave 62 to a sheave 64 on a shaft 65 comprising the lower element of the delivery rolls 14. The upper and cooperating elements of the delivery rolls comprise individual rolls having end trunnions 66 resting on arms 67 of the frame 10, these individual rolls resting by gravity on the shaft 65 in a manner adapted to grip the strands 12 therebetween. The sheaves 52 and 62 are of the speed change type, their intermediate elements 52′ and 62′ being adjustable axially to vary the active diameters of their belt-engaging grooves. Thus the relative speeds of the delivery rolls and drawing rolls can be immediately and conveniently changed merely by adjusting the elements 52′ and 62′, and the yarn twist and draft is thereby varied.

The upper portion of the frame 10 (Fig. 1) is of U-shaped construction 68 about the drawing units 4—5 and housed therein and supported on the two shafts 58 are a plurality of U-shaped units 70. Each unit 70, comprising two end plates 71 connected by a bar 72, is disposed between and somewhat beneath two adjacent twister tubes 15. The drawing rolls 4 are located outside of the plates 71 and cooperating therewith are the rolls 5 on the ends of shafts 74 mounted in slots 75 in the plates for movement toward and from the shafts 58. A rod 76 located midway between the plates 71 extends loosely through the bar 72 and through a plate 78. The plate 78 is located forwardly of and spans the shafts 74 and and a like plate 79 is fixed on the rod and spans the shafts rearwardly thereof. A spring 80 on the rod and resting against a nut 81 keeps the plate 78 in resilient contact with the shafts 74 and a spring 82 on the rod and resting against the bar 72 is adapted to move the rod and plate 79 forwardly to the position of Fig. 12 wherein the rolls 5 are separated from the rolls 4. A lever 83 has a bifurcated portion pivoted to the rear end of the rod and provided with right angular portions 84 for engaging the bar 72. When the lever is in the position of Fig. 7 the spring 80 holds the rolls 5 in strand gripping contact with the rolls 4 and when the lever is tripped to the position of Fig. 12 (and broken lines in Fig. 7) the spring 82 moves the shafts 74 and rolls 5 away from the rolls 4 in which position a strand can be dropped downwardly between the rolls 4 and 5. When the lever is again brought to the position of Fig. 7, the strand is gripped between the rolls.

Spinning and twisting machines employ a large number of units and mechanism, such as individual motors, for driving the spinning pots or spindles has heretofore presented a substantial problem and a large item of expense. An important feature of my invention relates to an extremely simple and inexpensive V-belt drive which performs this operation. By the employment of this drive, all the twister tubes 15 are driven by a single motor 86 together with a single V-belt 87 and all the spinning pots 24 are driven by a single motor 88 together with a single V-belt 89. These motors are mounted on one end of the frame 10 and the reaches of each belt engage the sheaves 16 and 31 to be driven. The reaches 90 of the belt 89 extend along the sheaves or whirls 31 and cooperating therewith are idlers 91 supported on posts 92 adjustable in slots 93 of the frame. Two sheaves are located between adjacent idlers and the idlers are adjustable to a position in which they hold the V-belt in driving contact with the sheaves, it being understood that the V-shaped surfaces of the V-belt provides a substantial driving area in wedging contact with the sheaves.

The spinning pots 24 are driven at speeds approximating 6,000 R. P. M. and they are so mounted that they normally remain centered and in balance. However, should one or more of the pots get out of balance, it is desirable that that the machine should be stopped and the trouble immediately corrected. My invention contemplates means for automatically checking the spinning pots in this respect. One side of the control circuit to the motor 88 is grounded to the frame 10 at 95 (Fig. 18) and the other side is connected to a bar 96 mounted on but insulated from the frame at 94. This bar extends along the spinning pots and provides a contact element located laterally outside of and adjacent to a peripheral portion of each spinning pot. If a spinning pot gets out of balance, it will contact the bar and operate through an electro-magnetically controlled switch in the box 97 to reduce the speed of or stop the motor.

The operation of the machine is substantially as follows:

The variable speed sheave 52 is set to produce the desired twist and the variable speed sheave 62 is set to produce the desired draft. The pots are then brought up to speed. The machine is threaded by placing the strand between the delivery rolls 14—65 and dropping the end of each strand 12 downwardly through its twister tube 15 and between the rolls 4—5 which have been released to the open position of Fig. 12. The lever 83 is then moved to the position of Fig. 7 in which the rolls 4—5 grip the strand therebetween. Means (not illustrated) is provided in connection with the rods 41 for dropping all the tubes 22 to the position of Fig. 1 wherein the tubes substantially close the openings 35 when starting the strand ends. With the strands gripped by the rolls 4—5 and the tubes 22 dropped, the twister tubes and drafting rolls are started. Rotation of the rolls 4—5 passes the strands downwardly into the guides 20 and rotation of the spinning pots draws currents of air downwardly through the guides and tubes whereby conducting the strands to the chambers 34. The traversing mechanism is then set in motion whereupon the tubes 22 are reciprocated vertically within the pot chambers 32. When the tubes raise from the chambers 34 the strands pass into the notches 36 and are thereafter wound into cheeses 44 by centrifugal force.

The surface speed of the drawing units 4—5 is somewhat faster than the surface speed of the delivery rolls 14 and 65 to effect stretching or drafting of the strand therebetween, the shoulders at 18 causing a rapid vibrating or trembling action on the strand which action is commonly called "teetering." The twister tube 15 gives a strengthening-sealing twist to the strand in a drawfield between the gripped positions 14 and 4—5 whereby twisting and strengthening the strand at the weaker spots and causing elongation to take place at the thicker spots, this twist concentrating at the shoulders 18 and diminishing therefrom to the rolls 14.

The spinning pots 24 can be rotated in either direction by the reversible motor 88 to get right or left hand twist. The rotary speed of the spinning pots will in any case be substantially greater than that of the twister tubes and in all cases the pot spinning twist travels up the strand through the units 4—5 and cooperates with and blends into the strengthening and sealing twist. When one unit 4—5 releases its grip on the strand the twist in the strand passes through such unit to the other unit and, when the other unit releases its grip, this twist passes further therethrough along the strand. When the spinning pot is rotated in a direction opposite to that of the twister tube, the pot twisting action cooperates with the twister tube to concentrate between the units 4—5 and the shoulders 18 a twist greater than the twist in that portion of the strand between the shoulders and the delivery rolls 14 and this greater twist is in the same direction as the pot twist beneath the units 4—5. The characteristics imparted to the yarn by twisting and teetering action of the twister tube are retained in the twisted yarn as it passes downwardly through the units 4—5 and into the spinning pot and the greatest concentration of twist is located below the units 4—5.

The apparatus is so constructed and adjusted that the pot spinner twist travels upwardly through the units 4—5 sufficiently to properly concentrate the twist between these units and the point of contact of the strand with the twister tube and this concentrated twist is in one and the same direction regardless of the relative rotations of the twister tube and spinner pot. Furthermore, when the tube and pot are rotated in the same directions the twist extends upwardly in the same direction to the delivery rolls 14. Thus, in either case, the twister tube and pot spinner cooperate to concentrate the twist between the units 4—5 and the point of contact of the strand with the twister tube to produce an even yarn that will not break excessively, and leaves the drafting portion of the strand between the twister tube and the delivery rolls 14 lightly twisted to facilitate drafting. Most of the drafting or elongating of the strand therefore takes place between the shoulders 18 and the rolls 14 and the twisted portion of the strand beneath the shoulders 18 remains as permanent twist as the strand passes through the apparatus and into the spinning pot.

It should be understood that the resultant twists and the directions and concentrations thereof in the various parts of the drawfield are so dependent upon various factors, such as the relative speeds and directions of rotation of the spinning pot and twister tube and speed of strand feed, that a definite and fixed statement relative to the effects produced cannot be made. These factors will be varied in accordance with the character of yarns being operated upon and the desired characteristics of the final product and such variations can substantially effect the operating functions and the final product. Such statements relative to these effects as are made herein are made from observation of a machine now in operation and embodying my invention.

In continuous spinning operations heretofore known the strand is given a false twist which is effected by supporting the strand at two spaced points defining a drawfield therebetween and twisting the strand intermediately of such points. This twisting is termed "false" for the reason that none of such twist passes into the strand beyond either of the two points nor does any permanent twist pass into this field. In my apparatus one of these points comprises the units 4—5 which permit the passage of twist from the spinning pot into the drawfield whereby the strengthening and sealing twist therein becomes permanent twist due to the twisting cooperating of the spinning pot. The twisting and teetering action resulting from the twisting of the strand by the tube 15 causes the fibers of the yarn to project outwardly of the strand whereby producing a very desirable soft, bulky and woolly effect, and such effect is permanently retained in yarn produced by my machine since the strengthening and sealing twist is not allowed to come out of the strand. In yarn produced by the "false" twisting method this desirable effect and these characteristics are lost since the "false" twist which holds these characteristics is allowed to go entirely out of the strand which is then reformed by the subsequent permanent twisting operation thereon.

The air current effected by the fan 37 aids the yarn in its passage through the guide and tube into the spinning pot and the partition 26 serves to confine the channel 28 to a relatively small and free passage and prevents objectionable ballooning of the yarn. During the spinning operation the tube 22 together with the cone 47 thereon is reciprocated vertically whereby building up a cheese 44 of yarn within the rotating pot as will be understood. When the cheeses have reached the desired size, the tubes 22 are dropped to the position of Fig. 1 and the machine is stopped. The cheeses thereupon collapse onto their cones 47 which are free to rotate with the pots and the cheeses together with the cones are then removed from the pots and empty cones substituted therefor on the elements 46.

It will be noted that each time a tube 22 is dropped into its chamber 34 and withdrawn therefrom the strand projecting from the end of the tube passes into the notch 36. Furthermore, if during the spinning of a cheese a strand 12 breaks or comes to its end the operator pushes the yoke 40 rearwardly, permitted by the spring 43, whereupon the tube 22 drops into the chamber 34 and carries the end of the strand into the notch 36. Likewise, the new strand end is passed into the notch after it has been threaded into the chamber 34 and the tube again raised from this chamber. It will also be noted that the initial portions 98 of the strand ends which have not received full twist are retained in the chamber 34. When the cheese is removed from the pot, these strand ends project outwardly therefrom in radial alignment at one end of the cheese and their relative radial positions indicate which ends should be tied together to unite the cheese into a single strand. When the initial end portions have been removed and the ends tied, the cheese is ready for use.

An important feature of the invention relates to the novel and rapid threading of strands into the machine, resulting in the elimination of imperfections in the fabric and permitting operation of the machine at speeds substantially greater than has been heretofore possible, the air current effected by the fan 37 contributing very substantially to these results. In spinning mechanism heretofore known it has been necessary to limit the operation to a speed at which broken strands could be pieced up without interrupting the operation of the machine and such pieced-up ends have produced objectionable piecing and imperfections in the final product. The quick and semi-automatic threading permitted by my improved mechanism eliminates such necessity for speed limitation and thereby makes great increase of production possible. When a strand 12 breaks in my machine the operator releases the yoke 40 whereupon the tube 22 drops into the opening 35. He then drops the loose end of the strand by gravity into and through the tube 15 which he grasps and holds from rotation, whereupon the units 4—5 pass it downwardly into the guide 20 and, the tube 22 being in the position of Fig. 1, the air current draws the strand downwardly into the chamber 34. Thus re-threading is effected without requiring the uniting of the two broken and faulty end lengths and without limiting the speed of the machine. The combination of an easy threading tube and drawing rolls, thread guide, and centrifugal spinning pot with its lower chamber 34 and fan makes it unnecessary to join the yarn during spinning and permits the removal of faulty ends and imperfect lengths when tying the ends, which lengths might otherwise be incorporated in the yarn package and the fabric made therefrom.

Spinning by the use of centrifugal force and with a minimum of ballooning in accordance with my invention enables the strand to be spun with a light tensioning and produces a yarn having permanently retained therein characteristics which are developed during the drafting. Furthermore, the strand in the cheese is of full twist, substantially free of faulty lengths and has a minimum of knots. These characteristics are quite in contrast to cheeses heretofore commonly prepared from small two-ounce bobbins of spun yarn, twenty-five of which are commonly incorporated into the forming of a cheese. That method of spinning limits the spun package to two ounces of yarn and twenty-five such packages are thereafter wound into a cheese, requiring twenty-five doffing operations in the spinning and twenty-five tying operations in the winding. My invention not only eliminates forty-eight of these fifty operations but my product is of substantially superior quality and the numerous knots and imperfect lengths present in yarn spun by previous methods are eliminated.

It should be understood that the characteristics of the spinning product depend largely on the drafting and for this reason it will be found desirable and necessary to vary the type of drafting in ways well known to the art when different types of yarn are desired such as worsted yarn. Furthermore, it may be desirable to twist or ply two or more strands. It should be understood that my pot twisting and winding apparatus is adapted to serve all such cases, regardless of the type or even absence of drafting In such cases the strand is delivered axially into the guide tube 20, no thread eye being employed, and the twist inserted by the pot is allowed to run back to the strand delivery mechanism, thus greatly reducing possible breakage of the strand. It should also be noted that the restriction of the exit opening through the tube 22 at 25, together with the partition 26 in the tube 20, enables me to more than double the rotary speed of the pot 24, this result being due to the fact that such construction very substantially reduces ballooning of the yarn whereby reducing the tension thereon which causes the yarn to break. In mechanism which I have constructed and operated in accordance with the invention as herein disclosed, I have employed a spinning pot of 6″ inside diameter and have rotated it as high as 9,000 R. P. M.

It will be noted that the path of movement of the strand from the point 18 in the drawfield to the strand exit 25 within the spinning pot is in a straight and substantially vertical line. Such construction and arrangement utilizes gravity in supporting and aiding passage of the strand and permits the pot spinning twist to pass directly and uninterruptedly up the strand to the nip of the lower rolls 4—5 without touching any guide or element which would obstruct such action. It is apparent that such action can take place only by the employment of a spinning pot as the twisting and winding unit. The substitution of ring or cap spinning would necessarily require the employment of a centrally disposed guide or eyelet above the winding and twisting unit and such guide would seriously impede the upward passage of the twist along the strand as will be clearly apparent. The employment of a spinning pot in this combination is therefore essential to the full enjoyment of my invention. Attention is furthermore called to the fact that the employment of a spinning pot and the straight line path of movement of the strand makes the automatic threading of the strand possible, and the construction of my spinning pot 24 with its bottom chamber 34 permits the bringing of the strand along the straight line path directly into such chamber whereby facilitating the separation of the bad starting ends from the properly twisted yarn in the main portion of the pot. This arrangement and the automatic threading also provides for the rapid piecing up of the strands which in turn makes high speed operation of the front rolls 4—5 possible.

Having thus disclosed my invention, what I claim as new and desire to secure by Letters Patent of the United States is:

1. Twisting mechanism comprising a fixed strand receiving and guiding tube, a spinning pot below the tube in position to receive a strand therefrom, a second tube arranged for longitudinal reciprocation over the strand exit end of the first tube, and means for removably supporting on the second tube and within the pot a tube adapted to receive in collapsed form thereon a cheese formed centrifugally from a strand passing through the tubes and into the pot.

2. Twisting mechanism comprising a spinning pot having the side wall of its chamber tapering outward-upwardly and having its top end open to and commensurate with said wall, a strand guiding tubular member extending downwardly into the pot, and a removable yarn receiving tube thereon, the tubular member having a strand exit at its bottom end from which the strand is wound into a cheese in the chamber by centrifugal force, the tube being adapted to receive the cheese collapsed thereonto when the pot rotation is stopped and the collapsed cheese and tube being removable [upwardly] from the tubular member as a unit.

3. Twisting mechanism comprising a spinning pot, a strand guiding tubular member extending downwardly into the pot and adapted to support thereon a yarn receiving tube, the tubular member having a strand exit at its bottom end from which the strand is wound into a chesse in the chamber by centrifugal force, the tube being adapted to receive the cheese collapsed thereonto when the pot rotation is stopped and the collapsed cheese and tube being removable from the tubular member as a unit, and means for effecting a current of air through the tubes and into the pot in a direction to draw the strand into the pot.

4. Strand twisting mechanism, comprising a guide, a spinning pot therebeneath provided with a top chamber for receiving and winding a strand into a cheese by centrifugal force and a relatively smaller chamber beneath the top chamber, the pot having a centrally disposed opening between the two chambers, tubular means mounted for reciprocation on the guide and having a restricted strand conducting exit at its bottom end, the tubular means being movable to a position extending its exit end into said opening, and means for effecting a strand conducting current of air through the tubular means.

5. The mechanism defined in claim 4 in which the exit end of the tubular means is of a size substantially closing said opening when moved thereinto.

[6. Mechanism for twisting a continuous strand of fibrous material, comprising a fixed tubular guide having a strand conducting channel longitudinally therethrough, means for feeding the strand into the channel, means for inducing a current of air through the channel in the direction of movement of the strand, and a rotary pot located to receive the strand from the guide and wind it into a predetermined unit.]

7. A yarn guide comprising a tube, a partition within and extending longitudinally of the tube and dividing the tube into a plurality of channels, one of the channels being open throughout the length of the tube for guiding a strand therethrough and another channel being closed at its top end and open at its bottom end.

8. In a strand twisting mechanism, a tubular strand guide having abutment means within and extending substantially diametrically across and along the strand passage within the guide for limiting ballooning of the strand, and a tubular member mounted for reciprocation over one end of the guide and having a restricted strand conducting exit through the end thereof which projects beyond the guide.

9. Strand twisting mechanism comprising a strand conducting guide, a spinning pot therebeneath and having a centrally disposed opening at the bottom, and tubular means mounted for reciprocation on the guide and having a restricted strand conducting exit at its bottom end, the tubular means being movable to a position extending its strand exit end into said opening.

10. The mechanism defined in claim 9 plus traversing means cooperating with the tubular means and including means so engaging the tubular means from one side laterally thereof as to be instantly detachable for permitting the tubular means to drop into the said opening at the bottom of the spinning pot.

11. In strand twisting mechanism, a guide, a tubular member mounted for reciprocation thereover, and traversing mechanism therefor including a yoke engageable with the tubular member and means mounting the yoke for universal movement about axes parallel with and right angular to the tubular member.

12. In strand twisting mechanism, a strand guide, a tubular member mounted for reciprocation thereover, traversing mechanism therefor including a yoke engageable with the tubular member and a spring so holding the yoke engaged with the tubular member that rearward movement of the yoke against the action of the spring releases the yoke from the tubular member.

13. A rotary spinning pot having a top chamber for receiving and winding a strand into a cheese by centrifugal force and a relatively smaller chamber beneath and opening into the top chamber *and outwardly through the bottom portion of the pot.*

14. The spinning pot defined in claim 13 wherein the two chambers are in communication through an opening comprising a relatively large centrally disposed portion having a laterally disposed [notch-like portion] *yarn receiving notch at the junction of the two chambers.*

15. A rotary spinning pot having a chamber for receiving and winding a strand into a cheese by centrifugal force, and a fan carried by the spinning pot for drawing a current of air downwardly through the pot when the pot is rotated.

16. Mechanism for spinning a continuous strand of fibrous material, comprising a twister tube adapted to receive a strand, means for teetering the strand, fixed tubular means of substantial length having a restricted strand receiving channel therethrough beneath and adapted to receive the strand from the twister tube and limit ballooning thereof, a spinning pot beneath the tubular means for receiving the strand therefrom and twisting the strand and winding it into a cheese, strand carrying tubular means telescoped over the fixed tubular means and extending into the spinning pot, means for supporting and traversing the second named tubular means axially within the spinning pot, and means carried by the spinning pot for drawing a current of air through the strand channels of both tubular means and the spinning pot.

17. Mechanism for twisting a continuous strand of fibrous material, comprising means for feeding the strand, a tubular guide located to receive the strand, rotary pot strand twisting and winding means located to receive the strand from the guide and wind the same into a predetermined unit, and a partition within and extending along and across the tubular guide and forming one wall of an unobstructed strand passage through the guide.

18. The mechanism defined in claim 17 in which the said partition has a relatively long body portion having a thread guiding face located substantially at the center of the tubular guide and a portion at the top end thereof slanting laterally away from said center and providing a relatively angular surface leading to and cooperating with the first-named surface to guide the strand into and through the tube.

19. Mechanism for spinning a continuous strand of fibrous material, comprising means for holding and continuously delivering the strand to a drawfield, a rotary twisting tube in the drawfield spaced from said means and adapted to receive therefrom the strand into one end of the tube, means for teetering the strand, and strand drawing, twisting and winding means arranged to receive the strand from the other end of the tube and turn the strand on its axis to place twist therein extending upwardly from the winding position at the bottom end of the strand to and into the drawfield.

20. Mechanism for spinning a continuous strand of fibrous material, comprising a spinning pot, means for holding and continuously delivering the strand downwardly from a point located substantially above the spinning pot along a predetermined vertical path extending in a straight line from said point to the center of the spinning pot, and an abutment located substantially at and extending along and parallel with said path in position limiting ballooning of the strand.

21. The mechanism defined in claim 20 plus means for teetering the strand, and means comprising a plurality of strand drawing units in spaced relation along and gripping the strand at said path between said point and the abutment, the last-named means being constructed and arranged continuously to grip the strand and said units being constructed and arranged to grip and release the strand in a predetermined sequence.

*22. Mechanism for twisting a continuous strand of fibrous material, comprising a rotary spinning pot open at its top and bottom ends, a tubular guide extending into the pot and having a strand conducting channel longitudinally therethrough, means feeding the strand into the channel, and means for inducing a current of air through the channel and pot in the direction of movement of the strand, the rotary pot being adapted to receive the strand from the guide and wind it into a predetermined unit.*

JOHN J. McCANN.

No references cited.